(12) United States Patent
Kain

(10) Patent No.: US 6,467,839 B1
(45) Date of Patent: Oct. 22, 2002

(54) JUVENILE SEAT ARTICLE HOLDER

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/860,047

(22) Filed: May 17, 2001

Related U.S. Application Data
(60) Provisional application No. 60/234,552, filed on Sep. 22, 2000.

(51) Int. Cl.⁷ ................................................. A47C 7/62
(52) U.S. Cl. .............................. 297/188.14; 297/188.2; 297/227; 248/311.2
(58) Field of Search ........................ 297/188.2, 188.14, 297/227; 248/311.2

(56) References Cited

U.S. PATENT DOCUMENTS

| | | |
|---|---|---|
| 3,690,724 A | 9/1972 | Douglas et al. |
| 3,698,675 A | 10/1972 | Lerew et al. |
| 4,174,866 A * | 11/1979 | Rhyan ................. 248/311.2 X |
| 4,560,128 A | 12/1985 | Willeby et al. |
| 4,749,112 A | 6/1988 | Harper |
| 4,801,060 A | 1/1989 | Thompson |
| 4,825,590 A | 5/1989 | Cullinane |
| 4,858,796 A | 8/1989 | Roth |
| 4,858,869 A | 8/1989 | Stang |
| 4,877,284 A | 10/1989 | Doane |
| 4,928,876 A | 5/1990 | Marshall |
| 5,042,770 A | 8/1991 | Louthan |
| 5,072,909 A | 12/1991 | Huang |
| 5,279,452 A | 1/1994 | Huynh |
| 5,282,598 A | 2/1994 | Greene |
| 5,361,950 A | 11/1994 | Signal et al. |
| 5,503,297 A | 4/1996 | Frankel |
| 5,615,925 A | 4/1997 | Kain |
| 5,685,604 A | 11/1997 | Kain |
| 5,695,162 A * | 12/1997 | DiCastro ............... 248/231.81 |
| 5,746,363 A | 5/1998 | Teller et al. |
| 5,813,579 A | 9/1998 | Hendrickson |
| 5,865,412 A | 2/1999 | Mason |
| 5,967,345 A | 10/1999 | Subotin |
| 6,092,776 A * | 7/2000 | You ............................ 108/44 |
| 6,283,042 B1 * | 9/2001 | Wargo et al. ......... 297/188.2 X |

OTHER PUBLICATIONS

Photos of Century® Breverra® Ascend™ Youth/Booster Car Seat and cup device believed to be in public use prior to Sep. 22, 2000 (the filing date of the provision application to which priority is claimed).

Point–of–Purchase Tag for Century® Breverra® Ascend™ Yourth/Booster Car Seat.

* cited by examiner

Primary Examiner—Anthony D. Barfield
(74) Attorney, Agent, or Firm—Barnes & Thornburg

(57) ABSTRACT

A cup holder is provided to mount on an armrest included in a juvenile seat. The cup holder includes a receiver configured to receive a cup, juice box, container, or other articles and a receiver mount coupled to the receiver. The receiver mount includes a hanger configured to hang on the armrest and lie under a portion of the seat pad covering the juvenile seat. A retainer clip cooperates with the receiver mount to retain the cup holder on the armrest.

25 Claims, 7 Drawing Sheets

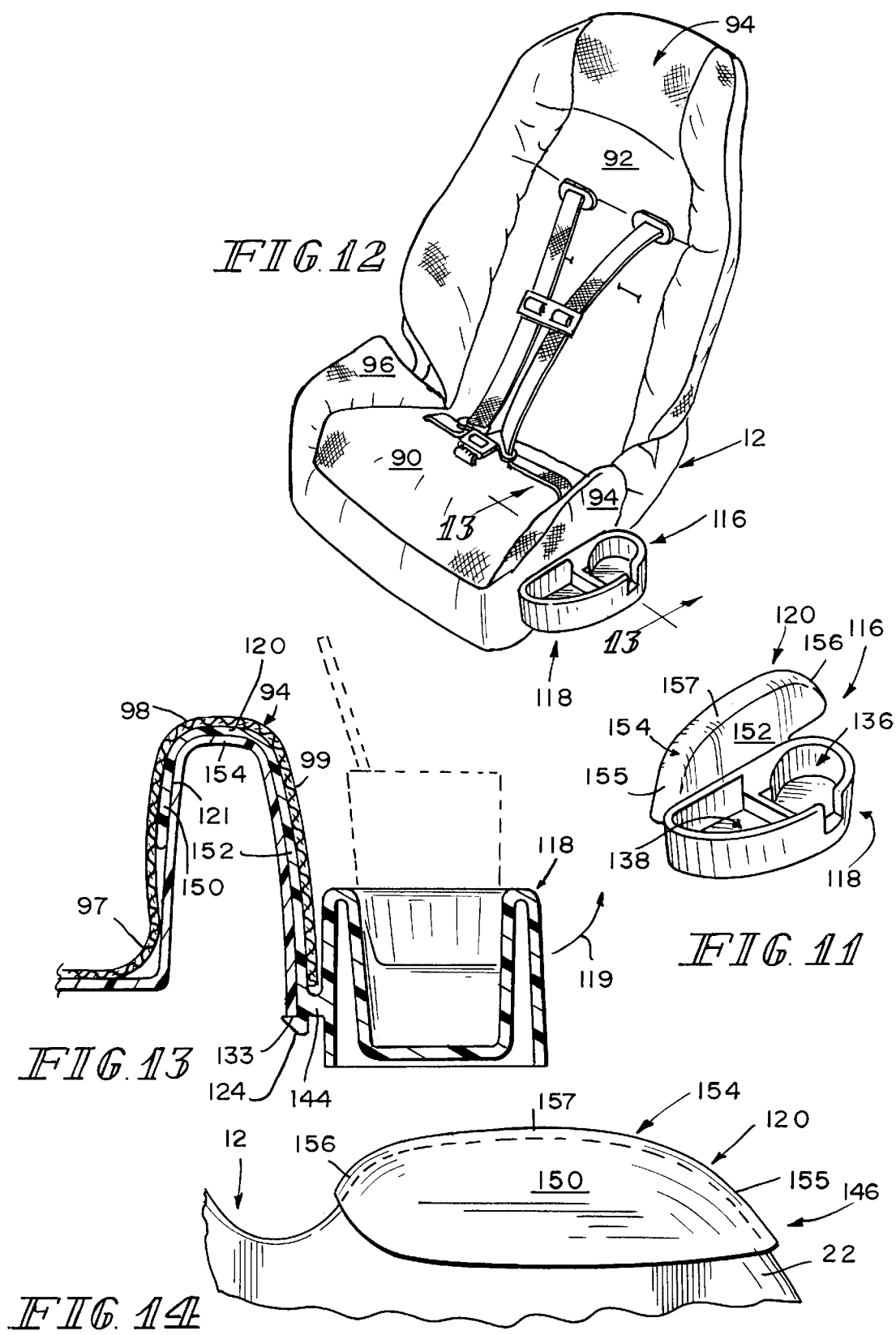

US 6,467,839 B1

JUVENILE SEAT ARTICLE HOLDER

This application claims priority under 35 U.S.C. 119(e) to U.S. Provisional Application Ser. No. 60/234,552, filed Sep. 22, 2000, which is expressly incorporated by reference herein.

BACKGROUND AND SUMMARY OF THE INVENTION

This invention relates to juvenile vehicle seats, and particularly to article holders for juvenile vehicle seats. More particularly, this invention relates to cup holder mounts adapted to mount a cup holder on a juvenile seat.

Young children are frequently thirsty and need liquids. Caregivers use various articles, such as, for example, cups, bottles, juice boxes, and the like to provide liquid to thirsty young children. When a table or other surface is not available, or when young children are seated in a juvenile seat, particularly a juvenile vehicle seat, it is convenient to have an article holder for holding cups, bottles, juice boxes, and the like.

According to the present disclosure, a juvenile apparatus includes a seat having an armrest and a cup holder. The cup holder includes a receiver for containers or other articles and a receiver mount coupled to the armrest to position the receiver alongside the armrest.

In one embodiment, a portion of the receiver mount is positioned to lie between the armrest and a side portion of a seat pad placed on the seat and arranged to cover the armrest. To install the cup holder on the seat, the side portion of the seat pad is lifted away from the armrest, the receiver mount is hung on the armrest to position the receiver alongside the armrest, and the seat pad is lowered onto the armrest to cover the receiver mount without covering the receiver.

In another embodiment, a retainer clip is coupled to the receiver mount and arranged to trap a portion of the armrest between the retainer clip and the receiver mount. The receiver mount includes a base coupled to the receiver and a hanger extending upwardly from the base and hanging on the armrest. The retainer clip includes a flange cantilevered to the base and arranged to engage a downwardly acing edge of the armrest. The receiver mount also includes a side wall aperture through which the retainer clip is visible before the cup holder is mounted on the armrest.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 11 is a perspective view of another cup holder;

FIG. 12 is a perspective view of a seat carrying the cup holder of FIG. 11;

FIG. 13 is a sectional view taken along line 13—13 of FIG. 11 showing the cup holder mounted on the armrest; and FIG. 14 is a partial side elevation view taken along line 14—14 of FIG. 13 (but with the seat pad removed) showing placement of this embodiment of the mount receiver on the armrest of the seat.

DETAILED DESCRIPTION OF THE DRAWINGS

Figure 1:
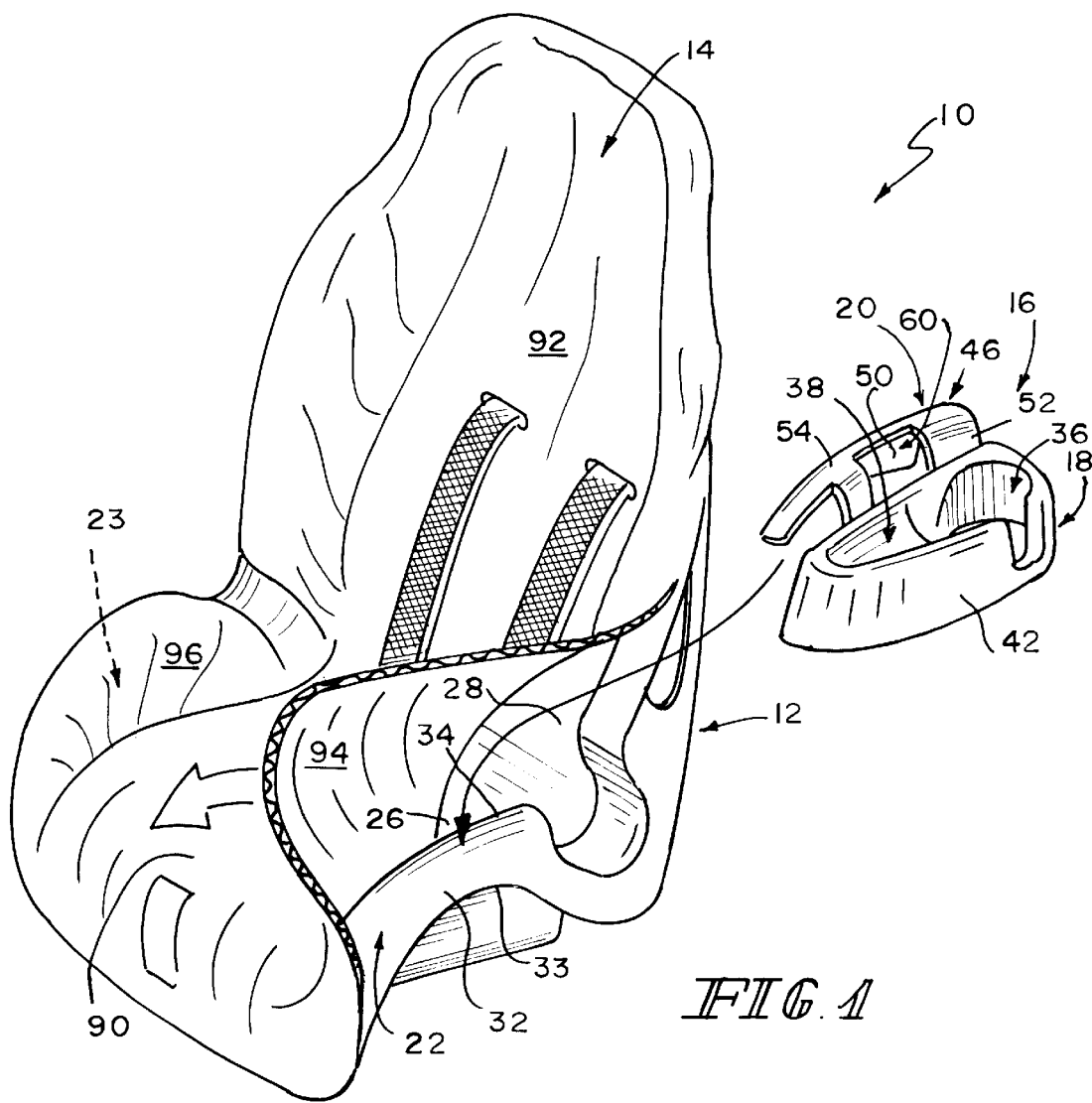
FIG. 1 is a perspective view of a juvenile seat showing a cup holder about to be mounted on an armrest to place the receiver for containers and articles alongside the armrest and the hanging receiver mount on the armrest under a side portion of the seat pad on the seat.
Figure 2:
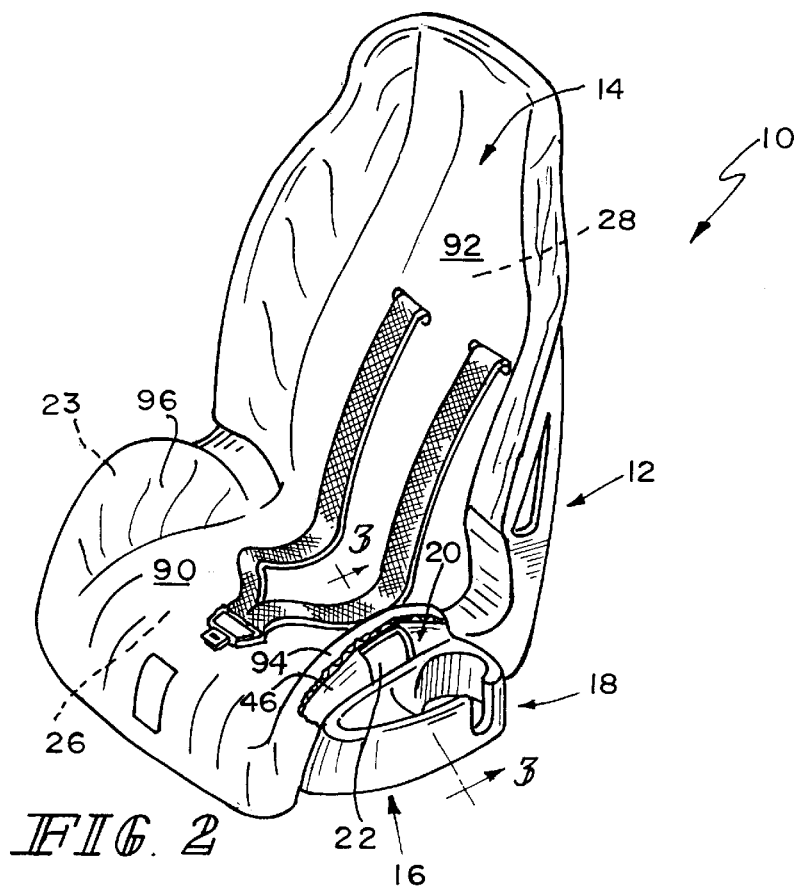
FIG. 2 is a perspective view of the juvenile seat of FIG. 1 showing the cup holder mounted on one of the armrests.

A juvenile apparatus 10 includes a seat 12, a seat pad 14 on seat 12, and a cup holder 16 as shown, for example, in FIGS. 1 and 2. Cup holder 16 includes a receiver 18 for containers or other articles (not shown) and a receiver mount 20 coupled to receiver 18 as shown, for example, in FIGS. 1, 5, and 6.

Receiver mount 20 is configured to hang on an armrest 22 included in seat 12 and lie under a portion of seat pad 14 to position receiver 18 alongside armrest 22 as shown, for example, in FIG. 2. A retainer clip 24 is coupled to receiver mount 20 as shown, for example, in FIGS. 4–7 and is arranged to trap a portion of armrest 22 between retainer clip 24 and receiver mount 20 as shown, for example, in FIGS. 3 and 4.

Seat 12 includes a seat bottom 26 and a seat back 28 extending upwardly from seat bottom 26. Armrest 22 is located along a left side of seat bottom 26 and armrest 23 is located along a right side of seat bottom 26 as suggested in FIG. 4.

Figure 3:
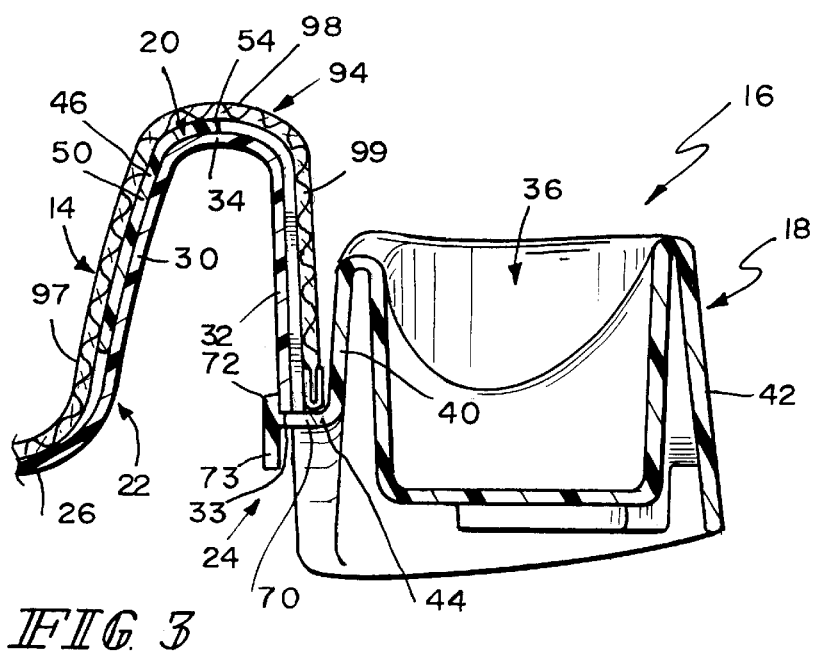
FIG. 3 is a sectional view taken along line 3—3 of FIG. 2 showing a receiver mount hanger hanging on the armrest under the seat pad, a retainer clip coupled to a receiver mount base and arranged to engage a downwardly facing edge of the armrest to trap a portion of the armrest between the retainer clip and the receiver mount hanger, and the receiver coupled to the receiver mount base.
Figure 4:
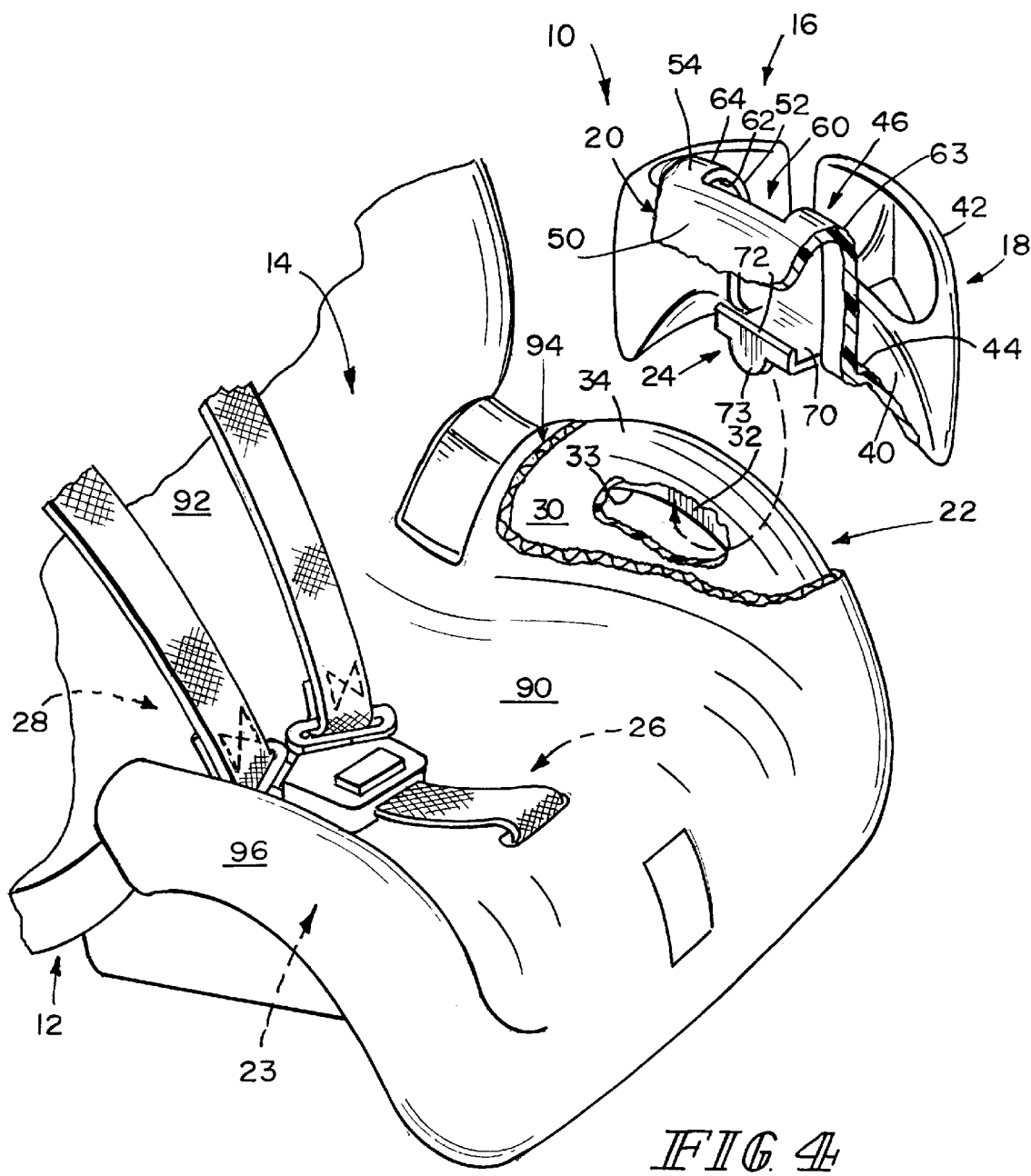
FIG. 4 is an enlarged perspective view of the seat and cup holder of FIGS. 1–3 showing the cup holder before it is mounted on the armrest and a cantilevered flange and upwardly extending lip (on a distal end of the cantilevered flange) included in the retainer clip and showing how the retainer clip moves to engage a downwardly facing edge of the armrest as the cup holder is mounted on the armrest.

Each armrest 22, 23 includes an inner side panel 30 coupled to seat bottom 26, an outer side panel 32 positioned to lie in spaced-apart relation to inner side panel 30, and a top ridge 34 interconnecting upper portions of inner and outer side panels 30, 32, as shown, for example, in FIGS. 1, 3, and 4. Each outer side panel 32 includes a downwardly facing edge 33 engaged by retainer clip 24 when cup holder 16 is mounted on seat 12 to assist in retaining cup holder 16 in a mounted position on seat 12.

Receiver 18 may be configured to assume any suitable shape and receive one or more cups, juice boxes, containers, or other articles (not shown). In the embodiment illustrated in FIGS. 5 and 6, receiver 18 includes a first receptacle 36 configured to receive a round cup or a rectangular juice box and a second receptacle 38 configured to receive other articles. Receiver 18 also includes an inner portion 40 coupled to receiver mount 20 and an outer portion 42 bordering first and second receptacles 36, 38.

Receiver mount 20 includes a base 44 coupled to inner portion 40 of receiver 18 and a hanger 46 arranged to extend upwardly from base 44 and hang on armrest 22. Hanger 46 engages top ridge 34 and inner and outer side panels 30, 32 of armrest 22 as shown, for example, in FIGS. 3 and 10.

Figure 5:
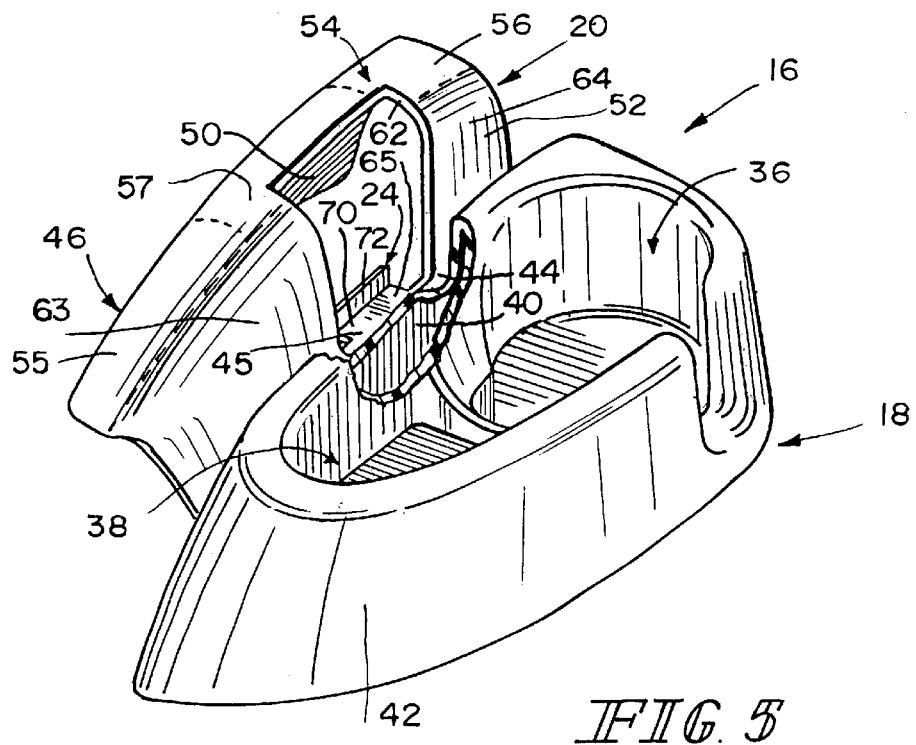
FIG. 5 is a perspective view of the cup holder of FIGS. 1–4 showing the receiver (on the right), the receiver mount (on the left), and the retainer clip (visible through a side wall aperture formed in the receiver mount)
Figure 6:
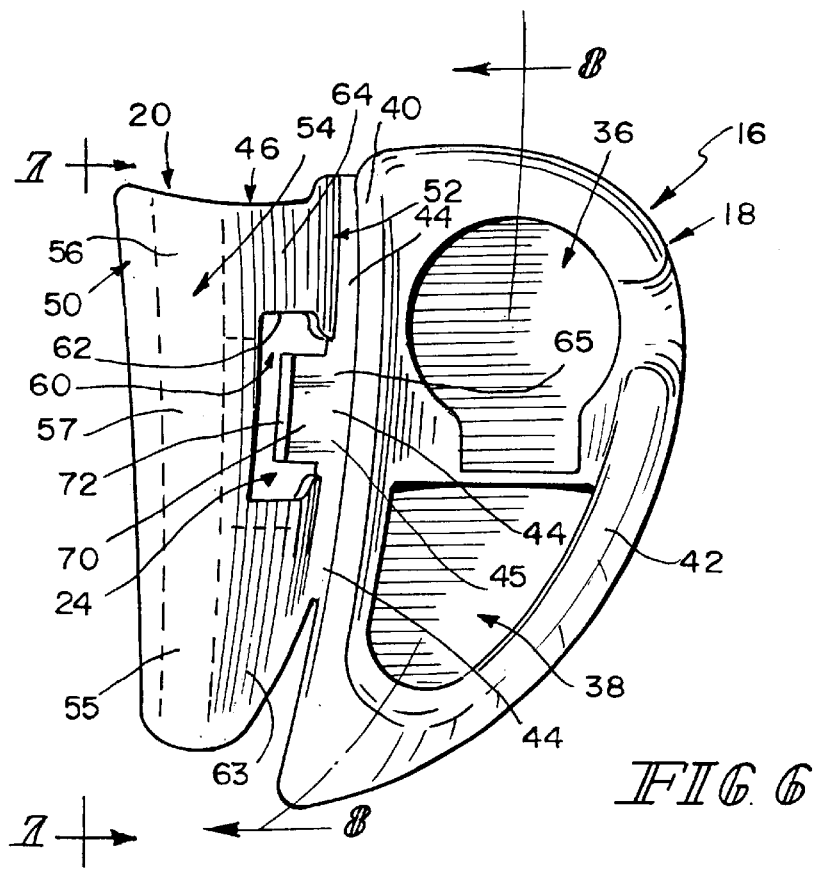
FIG. 6 is a top plan view of the cup holder of FIG. 5 showing that the retainer clip is coupled to the receiver mount base at a horizontally extending bottom portion of an interior edge around an aperture formed in a side wall of the receiver mount.

Hanger 46 includes an outer panel 52 extending upwardly from base 44, an inner panel 50 lying in spaced-apart relation to outer panel 52, and a top ridge 54 interconnecting inner and outer panels 50, 52 as shown best, for example, in FIGS. 1, 5, and 6. When hanger 46 is mounted on armrest 22, outer panel 52 of hanger 46 lies against outer panel 32 of armrest 22, inner panel 50 of hanger 46 lies against inner panel 30 of armrest 22, and top ridge 54 of hanger 46 lies against top ridge 34 of armrest 22.

In one embodiment, shown best in FIGS. 5–8, top ridge 54 of hanger 46 includes a rounded front support 55, a rounded rear support 56, and a middle support 57 between front and rear supports 55, 56. When viewed from the vantage point illustrated in FIGS. 7 and 8, a line 55' tangent to front support 55 has a positive slope and a line 56' tangent to rear support 56 has a negative slope. Accordingly, it can be said that front support 55 has a positively sloping outer forward surface, rear support 56 has a negatively sloping outer rearward surface, and middle support 57 has no substantial slope.

Figure 7:
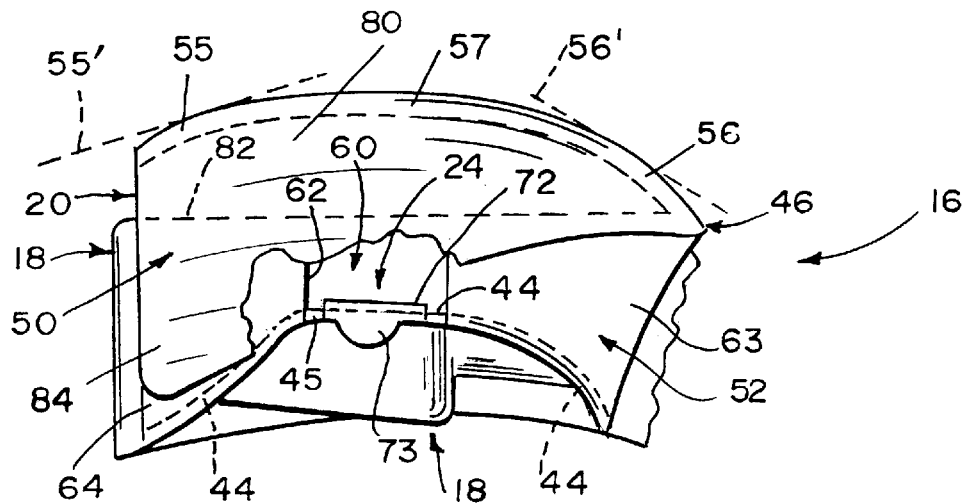
FIG. 7 is a side elevation view taken along line 7—7 of FIG. 6 showing the location of the retainer clip relative to the side wall aperture formed in the receiver mount.
Figure 8:
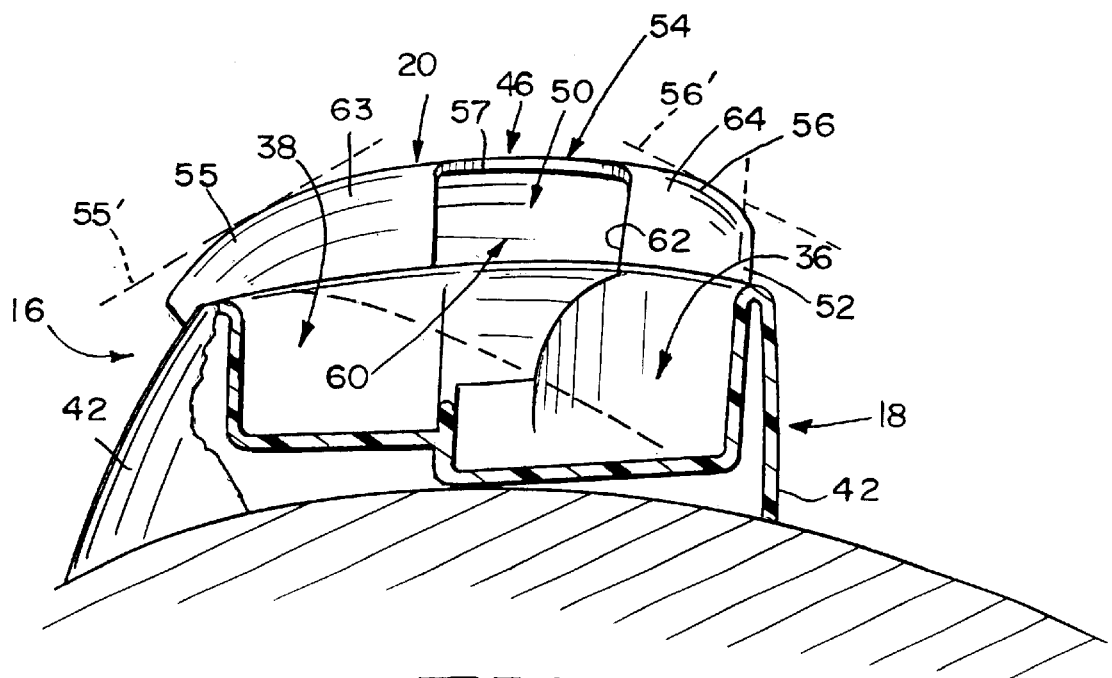
FIG. 8 is a sectional view taken along line 8—8 of FIG. 6 showing a portion of the cup holder (now mounted on the armrest of a seat)
Figure 9:
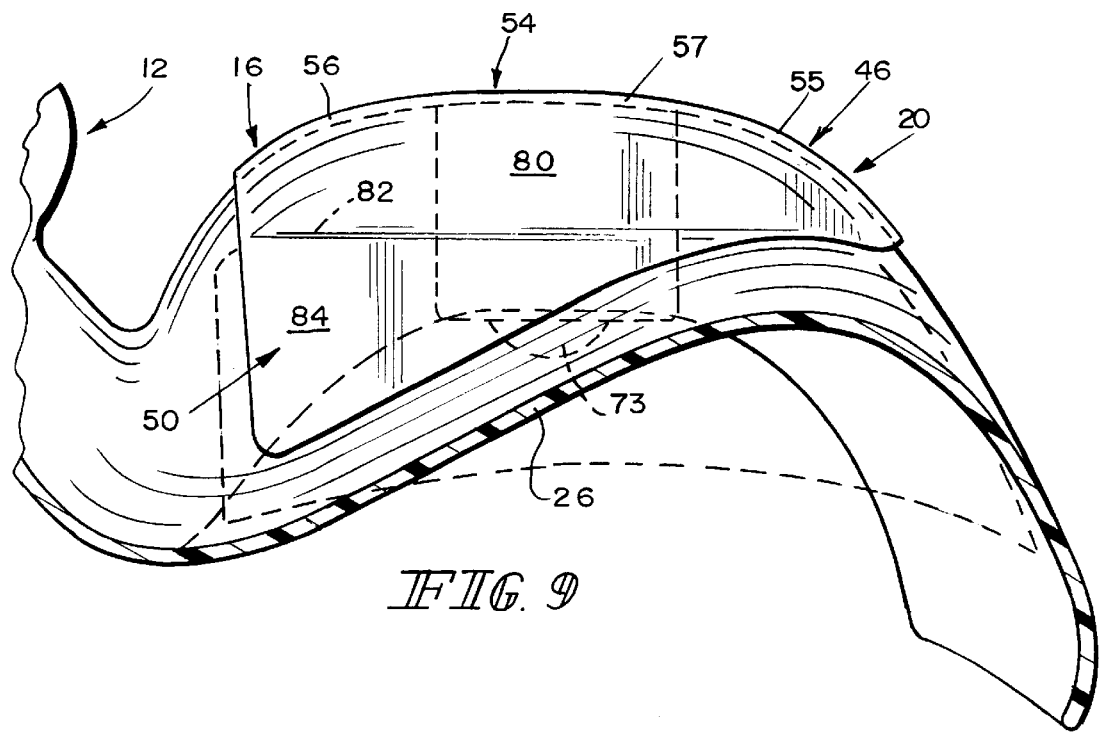
FIG. 9 is a partial side elevation view taken along line 9—9 of FIG. 10 (but with the seat pad removed) showing placement of one embodiment of the mount receiver on the armrest of the seat.

Base 44 extends laterally (as shown in FIG. 6) between a lower edge of inner portion 40 of receiver 18 and a lower edge of outer panel 52 of receiver mount hanger 46. In the illustrated embodiment, base 44 has a generally arcuate shape along its length as suggested in FIG. 7. Nevertheless, a middle portion 45 of base 44 located near retainer clip 24 is substantially horizontal as also shown in FIG. 7 and in FIG. 5.

Outer panel 52 of receiver mount hanger 46 includes an aperture 60 sized and located so that retainer clip 24 is visible therethrough as shown, for example, in FIGS. 5 and 6. An interior edge 62 of outer panel 52 borders aperture 60. Outer panel 52 includes two upwardly extending side portions 63, 64 arranged to lie in spaced-apart relation to one another to define the aperture 60 therebetween. A horizontally extending bottom portion 65 is arranged to lie between the two upwardly extending side portions 63, 64 and at a junction between outer panel 52 and base 44 as shown, for example, in FIGS. 5 and 6.

Retainer clip 24 includes a flange 70 cantilevered to base 44 and a lip 72 extending upwardly from a distal end of the cantilevered flange 70 as shown, for example, in FIGS. 5 and 6. Flange 70 is coupled to base 44 of the horizontally extending bottom portion 65 of the interior edge 62 of the hanger 46.

Figure 10:
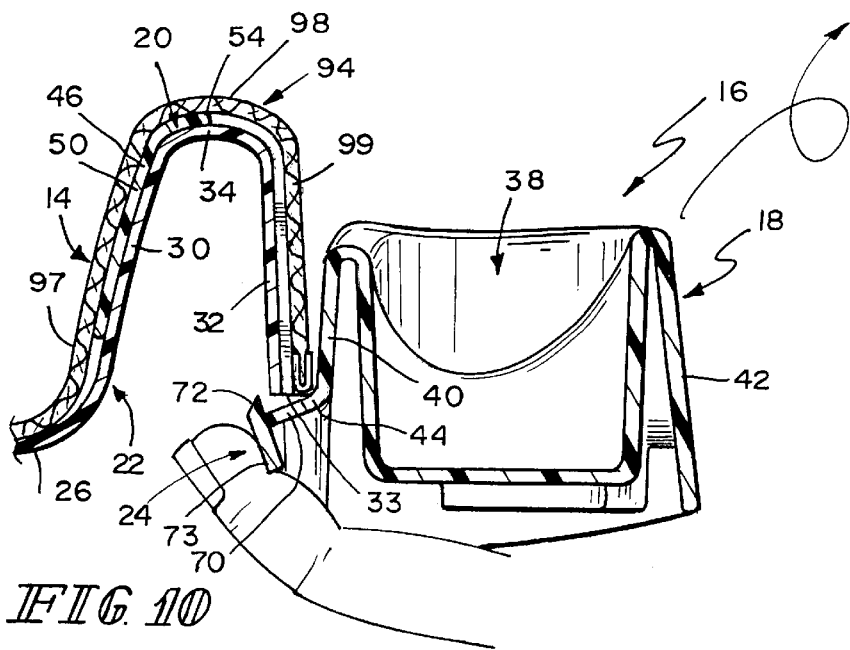
FIG. 10 is a sectional view similar to FIG. 3 showing manual movement of the retainer clip relative to the mount receiver to disengage the downwardly facing edge of the armrest preparatory to dismounting the cup holder from the armrest.

As shown in FIG. 3, cantilevered flange 70 is arranged to engage downwardly facing edge 53 of outer side panel 32 of receiver mount hanger 46 when hanger 46 is mounted on armrest 22. At the same time, lip 72 engages an inner surface of outer side panel 32 as shown in FIG. 3. Lip 72 and outer panel 52 of hanger 46 cooperate to define a channel receiving the outer panel 32 of armrest 22 therein. A tab 73 depends from the underside of cantilevered flange 70 and can be moved manually as shown in FIG. 10 to cause lip 72 and flange 70 to disengage outer panel 32 to facilitate removal of cup holder 16 from armrest 22.

Referring once again to FIGS. 4–6, receiver mount hanger 46 can, in one embodiment thereof, be formed to provide an inverted cup-shaped member having a "summit" defined by middle support 57 of top ridge 54 and "sides leading to the summit" defined by surfaces 55 and 56 along top ridge and surfaces along inner and outer panels 50, 52, which surfaces are arranged to slope downwardly and outwardly relative to middle support 57. Top ridge 54 is rounded laterally across its width as shown for example, in FIGS. 1, 3, and 5. Receiver mount hanger 46 has a generally U-shaped cross section.

As shown in FIG. 7, inner panel 50 of receiver mount hanger 46 includes an upper portion 80 defining a segment of a circle and having a curved upper edge extending along top ridge 54 and a straight bottom edge 82. Inner panel 50 also includes a triangle-shaped lower portion 84 depending from straight bottom edge 82 of upper portion 80.

Movement of cup holder 16 on armrest 16 toward and away from seat back 28 is limited somewhat by the oppositely sloping character of front and rear supports 55, 56. Front support 55 has a positive slope and rear support 56 has a negative slope so that each support 55, 56 mates and conforms with sloping portions of armrest 22 to limit movement of receiver mount hanger 46 on armrest 22 toward and away from seat back 28.

Once cup holder 16 is mounted on armrest 22, a portion of seat pad 14 is moved to cover receiver mount hanger 46 as suggested in FIGS. 1–3. The receiver 18 is left exposed to receive cups, juice boxes, containers, or other articles (not shown). Thus, the means for supporting the receiver 18 in a fixed position alongside armrest 22 of seat 12 is substantially hidden from view.

Seat pad 14 includes a bottom portion 90 placed on seat bottom 26, a back portion 92 placed on seat back 28, a side portion 94 sized to be placed on armrest 22 and coupled to bottom portion 90, and another side portion 96 placed on armrest 23 and coupled to bottom portion 90 as shown in FIG. 1. Side portion 94 includes an inner section 97, top section 98, and outer section 99 as shown in FIG. 3. When side portion 94 is arranged to cover receiver mount hanger 46 as shown, for example, in FIG. 3, inner section 97 covers inner panel 50, top section 98 covers top ridge 54, and outer section 99 lies between receiver mount 20 and receiver 18 and covers outer panel 50 and the aperture 60 formed in outer panel 50.

To install cup holder 16 on armrest 22, side portion 94 of seat pad 14 is lifted upwardly to expose armrest 22 as shown in FIG. 1, receiver mount hanger 46 of cup holder 16 is hung on armrest 22 to place receiver 18 alongside armrest 22, and side portion 94 of seat pad 14 is lowered to cover receiver mount hanger 46 and armrest 22 as shown in FIG. 2. An elastic cord or other elastic element can be included along an edge of seat pad side portion 94 so that, once released, side portion 94 will fit snugly over armrest 22 and receiver mount hanger 46. The process is reversed to remove cup holder 16 from seat 12. It is within the scope of this disclosure to configure cup holder 16 to mount on either one of or both of armrests 22, 23.

Another cup holder 116 is illustrated in FIG. 11. Cup holder 116 includes a receiver 188 formed to include receptacles 136, 138 and a cup-shaped receiver mount 120 configured to receive an upwardly extending portion of armrest 22 of seat 12 in an interior region 121 formed in cup-shaped receiver mount 120 as shown, for example, in FIGS. 13 and 14.

Receiver mount 120 includes a base 144 coupled to inner portion 140 of receiver 118 and a hanger 146 arranged to define the interior region 121 receiving armrest 22 therein. Hanger 146 is an inverted cup defined by an outer panel 152 extending upwardly from base 144, an inner panel 150 lying in spaced-apart relation to outer panel 152, and a top ridge 154 interconnecting inner and outer panels 150, 152. Top ridge 154 includes a forwardly sloping front support 155, a rearwardly sloping rear support 156, and a relatively horizontal middle support 157 interconnecting front and rear supports 155, 156.

A retainer clip 124 is coupled to base 144 and arranged to engage a downwardly facing edge 133 of outer panel 132 of receiver mount 120 as shown in FIG. 13. This engagement helps to retain cup holder 116 in a mounted position on armrest 22. Receiver 18 can be moved in direction 119 as shown in FIG. 13 to disengage retainer clip 124 from outer panel 132 to dismount cup holder 116 from armrest 22.

Although the invention has been described in detail with reference to certain preferred embodiments, variations and modifications exist within the scope and spirit of the invention as described and defined in the following claims.

What is claimed is:

1. A juvenile apparatus comprising
   a seat including a seat bottom and an armrest located along one side of the seat bottom,
   a seat pad including a side portion, the seat pad being positioned on the seat to retain the side portion above the armrest, and
   a cup holder including a receiver adapted to receive a container therein and a receiver mount coupled to the receiver, the receiver mount being coupled to the armrest to position the receiver alongside the seat, and a portion of the receiver mount being positioned to lie between the armrest and the side portion of the seat pad.

2. The juvenile apparatus of claim 1, wherein the receiver mount includes a base coupled to the receiver and a hanger extending upwardly from the base and the hanger includes an inner surface facing toward the armrest and an outer surface facing toward the side portion of the seat pad.

3. The juvenile apparatus of claim 2, wherein the cup holder further includes means on the base for engaging the armrest to retain the hanger in a fixed position on the armrest under the side portion of the seat pad.

4. The juvenile apparatus of claim 3, wherein the engaging means includes a flange cantilevered to the base and arranged to engage a downwardly facing edge of the armrest and a lip extending upwardly from a distal end of the flange and the lip and the hanger cooperate to define a channel receiving a portion of the armrest therein.

5. The juvenile apparatus of claim 2, wherein the cup holder further includes a retainer clip coupled to the base and arranged to engage the armrest.

6. The juvenile apparatus of claim 5, wherein the retainer clip includes a flange cantilevered to the base and arranged to engage a downwardly facing edge of the armrest and a lip extending upwardly from the flange and the lip and hanger cooperate to define a channel receiving a portion of the armrest therein.

7. The juvenile apparatus of claim 2, wherein the hanger includes an outer panel extending upwardly from the base and the outer panel is formed to include an aperture therein.

8. The juvenile apparatus of claim 7, wherein the hanger includes an interior edge arranged to border the aperture formed in the outer panel, the interior edge includes two upwardly extending side portions arranged to lie in spaced-apart relation to one another and a horizontally extending bottom portion arranged to lie between the two upwardly extending side portions and at a junction between the outer panel and the base, and the cup holder further includes a retainer clip coupled to the base at the horizontally extending bottom portion of the interior edge of the hanger and arranged to engage the armrest.

9. The juvenile apparatus of claim 1, wherein the seat pad further includes a bottom portion overlying the seat bottom and the side portion is coupled to the bottom portion and is configured to include an outer section that faces away from the seat bottom and lies between the receiver mount and the receiver to cover the portion of the receiver mount coupled to the armrest.

10. The juvenile apparatus of claim 1, wherein the armrest includes an inner side panel coupled to the seat bottom, an outer side panel positioned to lie in spaced-apart relation to the inner side panel, and a top ridge interconnecting upper portions of the inner and outer side panels, the receiver mount includes a hanger configured to engage the top ridge and the inner and outer side panels of the armrest, and the side portion of the seat pad also engages the top ridge and the inner and outer side panels of the armrest to trap the hanger therebetween.

11. The juvenile apparatus of claim 10, wherein the receiver mount further includes a base coupled to the hanger and to the receiver and the side portion of the seat pad includes an outer peripheral edge located between the hanger and the receiver and adjacent to the base of the receiver mount.

12. The juvenile apparatus of claim 11, wherein the hanger includes an outer panel extending upwardly from the base to lie against the outer side panel of the armrest, the outer panel of the hanger is formed to include an aperture therein, and the side portion of the seat pad is arranged to cover the aperture formed in the outer panel of the hanger.

13. The juvenile apparatus of claim 10, wherein the cup holder further includes means for engaging the outer side panel of the armrest to retain the hanger in a fixed position on the armrest under the side portion of the seat pad.

14. The juvenile apparatus of claim 13, wherein the outer side panel of the armrest includes a downwardly facing edge and an inner surface facing toward the inner side panel of the armrest and the engaging means includes a horizontally extending flange arranged to engage the downwardly facing edge of the armrest and a lip extending upwardly from the flange and engaging the inner surface of the outer side panel of the armrest.

15. A juvenile apparatus comprising
   a seat including a seat bottom and an armrest located along one side of the seat bottom and
   a cup holder including a receiver adapted to receive a container therein, a receiver mount coupled to the receiver, and a retainer clip coupled to the receiver mount and arranged to trap a portion of the armrest between the retainer clip and the receiver mount so that the receiver is positioned to lie alongside the seat, wherein the receiver mount includes a base coupled to the receiver and a hanger extending upwardly from the base and hanging on the armrest and the retainer clip is coupled to the base and arranged to extend under the armrest.

16. The juvenile apparatus of claim 15, wherein the retainer clip includes a horizontal flange coupled to the base and a vertical lip coupled to the horizontal flange and arranged to extend upwardly away from the horizontal flange.

17. The juvenile apparatus of claim 15, wherein the retainer clip includes a flange cantilevered to the base and arranged to engage a downwardly facing edge of the armrest.

18. The juvenile apparatus of claim 17, wherein the armrest includes an inner side panel coupled to the seat bottom, an outer side panel positioned to lie in spaced-apart relation to the inner side panel, and a top ridge interconnecting upper portions of the inner and outer side panels, the hanger engages the top ridge and inner and outer side panels of the armrest to support the receiver alongside the outer side panel of the armrest, and the outer side panel of the armrest includes the downwardly facing edge of the armrest.

19. The juvenile apparatus of claim 17, wherein the retainer clip further includes a lip extending upwardly from a distal end of the flange to engage an inner surface of the outer side panel.

20. The juvenile apparatus of claim 15, wherein the hanger includes an outer panel extending upwardly from the base and the outer panel is formed to include an aperture therein.

21. The juvenile apparatus of claim 20, wherein the hanger includes an interior edge arranged to border the aperture formed in the outer panel, the interior edge includes two upwardly extending side portions arranged to lie in spaced-apart relation to one another and a horizontally extending bottom portion arranged to lie between the two upwardly extending side portions and at a junction between the outer panel and the base, and the retainer clip is coupled to the base at the horizontally extending bottom portion of the interior edge of the hanger and arranged to engage the armrest.

22. The juvenile apparatus of claim 15, wherein the retainer clip includes a flange arranged to engage a downwardly facing edge of the armrest.

23. The juvenile apparatus of claim 22, wherein the flange is cantilevered to the receiver.

24. The juvenile apparatus of claim 22, wherein the receiver mount further includes a lip extending upwardly from a distal end of the flange.

25. A juvenile apparatus comprising
a seat including a seat bottom and an armrest located along one side of the seat bottom and
a cup holder including a receiver adapted to receive a container therein and a receiver mount for extending over the armrest, engaging a top surface of the armrest, hanging from the armrest and supporting the receiver in a selected position on the armrest, the receiver mount being formed to include an interior edge bordering an aperture formed in the receiver mount, and the cup holder further includes a flange extending from the interior edge to engage the armrest to trap a portion of the armrest between the flange and the receiver mount.

* * * * *